United States Patent
Ramanathan

(10) Patent No.: US 8,248,387 B1
(45) Date of Patent: Aug. 21, 2012

(54) EFFICIENT BUFFERING OF DATA FRAMES FOR MULTIPLE CLIENTS

(75) Inventor: Raju Ramanathan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1180 days.

(21) Appl. No.: 12/030,184

(22) Filed: Feb. 12, 2008

(51) Int. Cl.
- G06F 3/042 (2006.01)
- G06F 13/00 (2006.01)
- G06F 15/167 (2006.01)
- G06F 15/16 (2006.01)
- G06F 3/033 (2006.01)
- G09G 5/36 (2006.01)
- H04L 29/06 (2006.01)

(52) U.S. Cl. ........ 345/175; 345/536; 345/545; 345/547; 345/179; 709/212; 709/217; 709/231; 709/236; 713/150; 713/160; 178/18.09; 178/19.05

(58) Field of Classification Search .................. 345/173, 345/204, 213, 530–538, 545–548, 557–558, 345/175, 179–183; 709/212–219, 230–236; 713/150, 160; 178/18.09, 19.05
See application file for complete search history.

(56) References Cited

U.S. PATENT DOCUMENTS

| | | | |
|---|---|---|---|
| 6,046,753 A | 4/2000 | Searby et al. | |
| 6,775,423 B2 | 8/2004 | Kulkarni et al. | |
| 6,781,637 B2 | 8/2004 | Kimura | |
| 6,816,163 B2* | 11/2004 | Antila | 345/545 |
| 6,886,077 B2 | 4/2005 | Cuomo et al. | |
| 7,043,559 B2 | 5/2006 | Boskovic et al. | |
| 2004/0042547 A1* | 3/2004 | Coleman | 375/240.01 |
| 2005/0097445 A1 | 5/2005 | Day et al. | |
| 2006/0026181 A1* | 2/2006 | Glickman | 707/100 |
| 2006/0146881 A1 | 7/2006 | Basso et al. | |
| 2006/0184684 A1 | 8/2006 | Weiss et al. | |
| 2007/0028286 A1 | 2/2007 | Greene et al. | |

OTHER PUBLICATIONS

Radke, et al., "Image Change Detection Algorithms: A Systematic Survey", IEEE Transactions on Image Processing, vol. 14, No. 3, Mar. 2005, IEEE, pp. 294-307.
Roman, et al., "Tiled Image Caching System", pp. 11.

* cited by examiner

Primary Examiner — Lun-Yi Lao
Assistant Examiner — Jarurat Suteerawongsa
(74) Attorney, Agent, or Firm — Alleman Hall McCoy Russell & Tuttle LLP

(57) ABSTRACT

The efficient buffering of image data for a plurality of clients is disclosed. One disclosed embodiment comprises an optical touch-sensitive device configured to receive changed portions of a frame of data from a touch data acquisition system comprising a touch-sensitive display, to store the changed portions of the frame of data in a common data frame buffer, and to receive a bitmap header from the touch data acquisition system that specifies locations of the changed portions of the frame of data and store the bitmap header in each of a plurality of client header buffers. Clients can first obtain the bitmap header from buffers corresponding to those clients, and then obtain the changed portions of the frame of data from the common data frame buffer.

13 Claims, 4 Drawing Sheets

EFFICIENT BUFFERING OF DATA FRAMES FOR MULTIPLE CLIENTS

BACKGROUND

Touch-sensitive devices may detect inputs via several different mechanisms, including but not limited to optical, resistive, and capacitive mechanisms. For example, an optical touch-sensitive device may detect an input by capturing an image of a backside of a touch screen via an image sensor such as a camera, and then processing the image to detect objects located on the screen. Such a device may include an illuminant within the device to illuminate the backside of the display screen such that objects on the screen reflect the incident light toward the image sensor, thereby allowing the object to be detected.

Some optical touch-sensitive devices may acquire image data at relatively high frame rates. This may facilitate the tracking of fast motion, but also may give rise to difficulties in processing the image data with sufficient speed to avoid glitches in the tracking of touch inputs where multiple clients are accessing the image data.

SUMMARY

Accordingly, the efficient buffering of image data for multiple clients is disclosed below in the Detailed Description. For example, one disclosed embodiment comprises an optical touch-sensitive device comprising a touch data acquisition system configured to acquire a frame of data from a touch-sensitive display screen and to determine changed portions of the frame of data relative to a previous frame of data from the display screen, a processor, and memory comprising instructions executable by the processor to receive the changed portions of the frame of data from the touch data acquisition system and store the changed portions of the frame of data in a common data frame buffer, and to receive a bitmap header from the touch data acquisition system that specifies locations of the changed portions of the frame of data and store the bitmap header in each of a plurality of client header buffers. In this manner, clients can first obtain the bitmap header from buffers corresponding to those clients, and then obtain the changed portions of the frame of data from the common data frame buffer.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
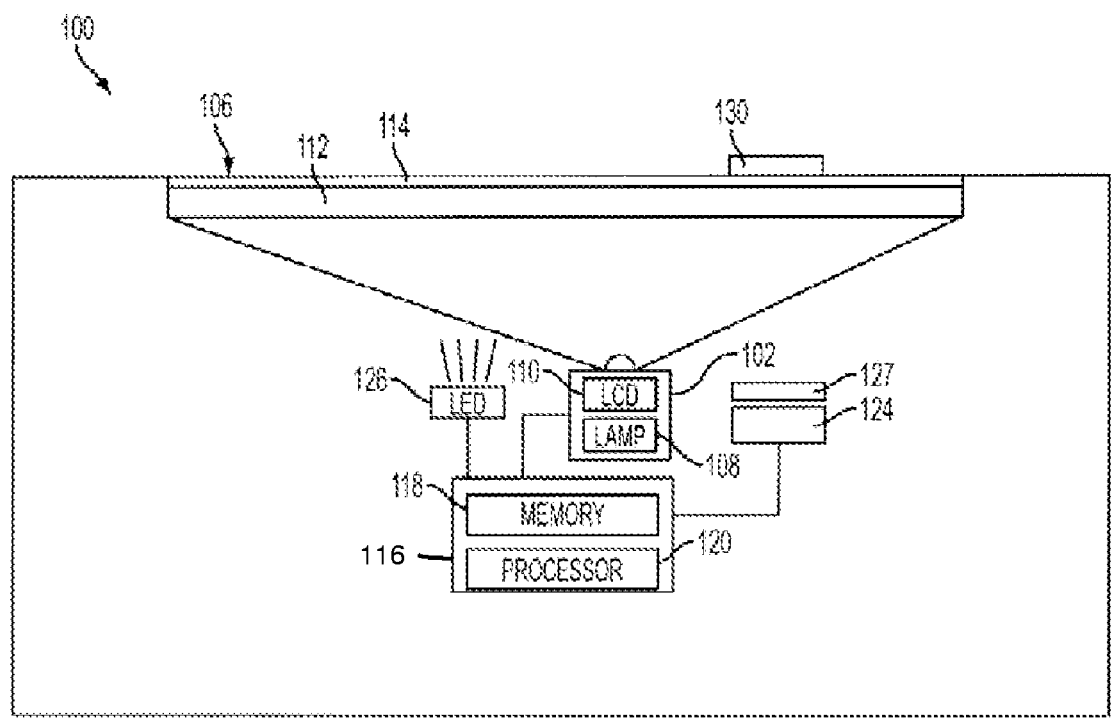
FIG. 1 shows an embodiment of a touch-sensitive device.

Prior to discussing context based support for multiple clients using a common data frame buffer, an embodiment of a suitable use environment is described. FIG. 1 shows a schematic depiction of an embodiment of an optical touch-sensitive device in the form of an interactive display device 100. The interactive display device 100 comprises a projection display system having an image source 102, and a display screen 106 onto which images are projected. While shown in the context of a projection display system, it will be appreciated that the embodiments described herein may also be implemented with other suitable display systems, including but not limited to LCD panel systems.

The image source 102 includes a light source 108 such as a lamp (depicted), an LED array, or other suitable light source. The image source 102 also includes an image-producing element 110 such as the depicted LCD (liquid crystal display), an LCOS (liquid crystal on silicon) display, a DLP (digital light processing) display, or any other suitable image-producing element.

The display screen 106 includes a clear, transparent portion 112, such as sheet of glass, and a diffuser screen layer 114 disposed on top of the clear, transparent portion 112. As depicted, the diffuser screen layer 114 acts as a touch surface. In other embodiments, an additional transparent layer (not shown) may be disposed over diffuser screen layer 114 as a touch surface to provide a smooth look and feel to the display surface. Further, in embodiments that utilize a LCD panel rather than a projection image source to display images on display screen 106, the diffuser screen layer 114 may be omitted.

Continuing with FIG. 1, the display device 100 further includes an electronic controller 116 comprising memory 118 and a microprocessor 120. Controller 116 may further include any other suitable electronic components, including application-specific integrated circuits (ASICs) (not shown), digital signal processors (DSPs) (not shown), field-programmable gate arrays (FPGAs), etc. It will further be understood that memory 118 may comprise instructions stored thereon that are executable by the processor 120 to control the various parts of device 100 to effect the methods and processes described herein.

To sense objects placed on display screen 106, the display device 100 includes an image sensor 124 such as a camera configured to capture an image of the entire backside of display screen 106, and to provide the image to electronic controller 116 for the detection of objects appearing in the image. This allows the detection of multiple touches from any number of different types of objects on the screen at one time. For example, multiple finger touches by one or more users, as well as multiple touches by other objects such as brushes, styluses, optically readable tags, etc. may be detected and tracked at one time. The diffuser screen layer 114 helps to avoid the imaging of objects that are not in contact with or positioned within a few millimeters of display screen 106, and therefore helps to ensure that objects that are touching or in close proximity to display screen 106 are detected by image sensor 124.

The image sensor 124 may be configured to detect light of any suitable wavelength, including but not limited to infrared and visible wavelengths. To assist in detecting objects placed on display screen 106, the image sensor 124 may further include an illuminant 126 such as one or more light emitting diodes (LEDs) 126 configured to produce infrared or visible light to illuminate a backside of display screen 106. Light from illuminant 126 may be reflected by objects placed on display screen 106 and then detected by image sensor 124. The use of infrared LEDs as opposed to visible LEDs may help to avoid washing out the appearance of images projected on display screen 106. Further, an infrared band pass filter 127 may be utilized to pass light of the frequency emitted by the illuminant 126 but prevent light at frequencies outside of the band pass frequencies from reaching the image sensor 124, thereby reducing the amount of ambient light that reaches the image sensor 124.

FIG. 1 also depicts an object 130 placed on display screen 106. Light from the illuminant 126 reflected by object 130 may be detected by image sensor 124, thereby allowing the object 130 to be detected on the screen. Object 130 represents any object that may be in contact with display screen 106, including but not limited to fingers, brushes, optically readable tags, etc.

The image sensor 124 may include any suitable image sensing mechanism. Examples of suitable image sensing mechanisms include but are not limited to one or more CCD and/or CMOS image sensors. Further, the image sensor 124 may capture images of display screen 106 at a sufficient frequency to detect motion of an object across display screen 106.

Image sensor 124 may be connected to controller 116 in any suitable manner. For example, in one embodiment, image sensor 124 is connected to the controller 116 through a PCI adapter or other interface. In this embodiment, a vision system application, also referred to herein as a client, may request a capture of camera image data through a kernel mode driver which in turn controls the PCI adapter. The driver then supplies image data from a current frame from the image sensor to the vision system application that requested the image data. The image sensor, PCI adapter and driver all may be considered to be components of a touch data acquisition system, which in the above-described embodiment is a multi-touch data acquisition system. The term "client" may refer to applications running in a common session, separate sessions, users, or any other suitable entity that may receive image data from a common data frame buffer. For example, in some embodiments separate applications may run on multiple devices or may be resident on a single device, such as the interactive display device 100 described in reference to FIG. 1. Additionally, in some embodiments the clients may be separate sessions and may be initiated by multiple users.

In other embodiments, the touch-sensitive input may comprise an external device that is connected to the controller 116 via an interface such a standard serial bus (e.g. USB or 1394). Further, while described herein in the context of an optical touch-sensitive system, it will be appreciated that any other suitable touch-sensitive input may be used. Examples include, but are not limited to, capacitive and resistive touch-sensitive mechanisms. The terms "image", "image data", "frame of data", "data frame", and the like as used herein comprise any array of data received from a touch-sensitive device related to a location and/or intensity of touch inputs on the device, and may refer to data from optical, capacitive, resistive, etc. touch sensitive systems.

To reduce an amount of data to transfer into an image buffer from the image sensor 124, the touch data acquisition system may be configured to transfer only changed regions of a frame of data relative to a previous frame of data, along with a bitmap that specifies the location of the changed regions within the overall data frame. However, at higher frame rates, problems still may arise when multiple clients are simultaneously connected to the driver. This may occur, for example, where two user sessions are running on the interactive display device 100 at the same time (for example, one active and one in the background), or where two applications in the same session are requesting data. In this case, image data from the camera (or other touch-sensitive device) is distributed to the clients on a first-come, first-served basis. In the absence of a buffering scheme to provide current image data to all requesting clients, none of the clients would receive all of the data frames to parse and track the objects in real time. Further, an approach that simply caches the image data from the touch-sensitive device may encounter similar problems where different clients request data at different speeds or different times. Maintaining a data buffer for each client may be resource intensive, as it may involve reconstructing an image in every image buffer for each client. This may result in time-consuming operations, and lead to frame loss.

Figure 2:
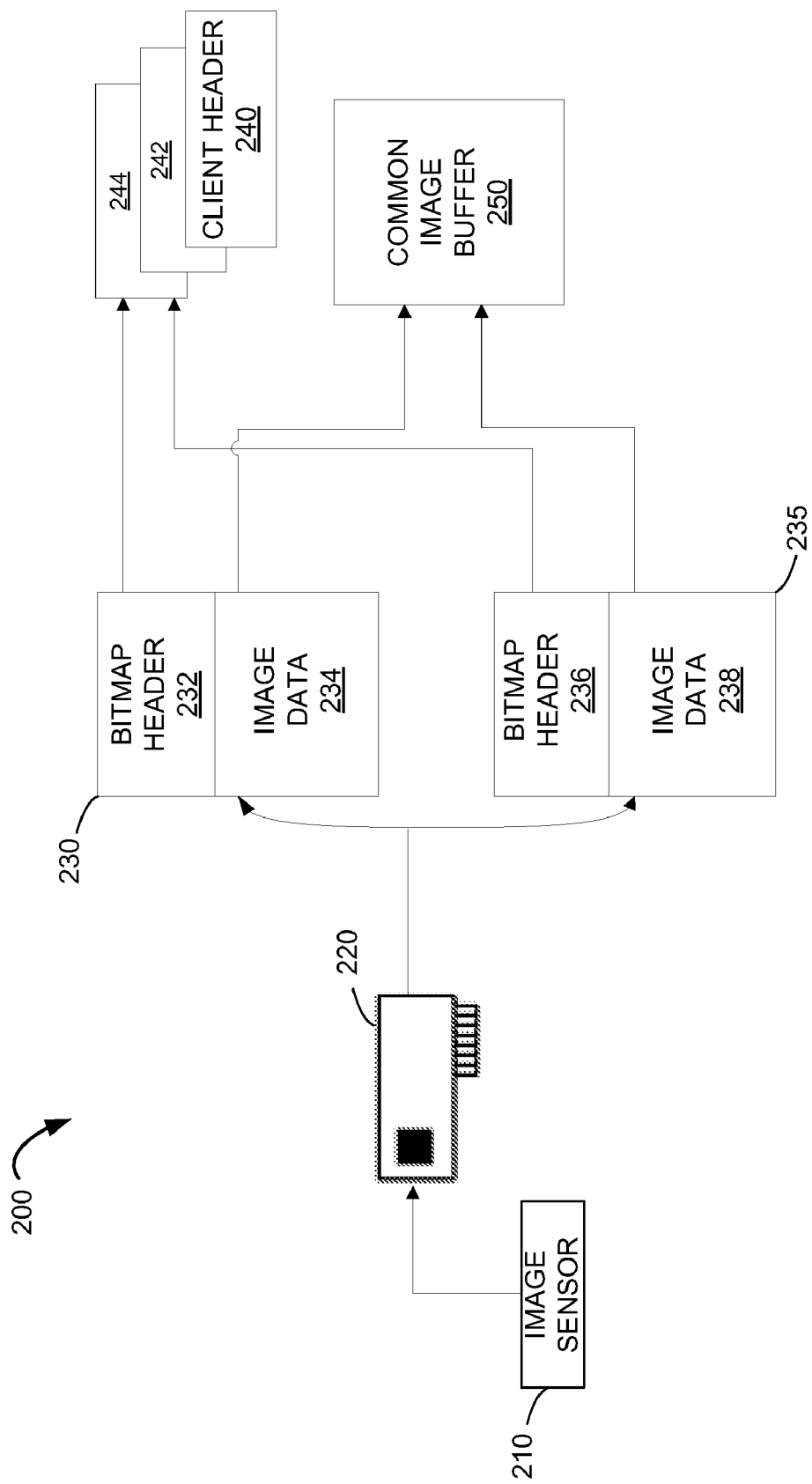
FIG. 2 shows a block diagram of an embodiment of an image data buffering system illustrating data flow from hardware to a common data frame buffer.

In light of such difficulties with providing up-to-date data for a plurality of clients, FIG. 2 shows one embodiment system 200 to illustrate data flow from hardware to a common data frame buffer that may help to overcome such issues. System 200 may be implemented in the interactive display device 100 depicted in FIG. 1, but embodiments are not so limited. Referring to FIG. 2, the system includes an image sensor coupled with an interface 220. Interface 220 may be a networking or computing interconnect, such as a PCI interconnect using a PCI adapter, a serial interface such as a USB or 1394 interface, or any other suitable interface. System 200 also includes a first transfer buffer 230 and a second transfer buffer 235. Other embodiments may use one or more transfer buffers and are not limited to the two illustrated in FIG. 2, depending upon desired frame rates and available processing speeds. Each transfer buffer 230, 235 is configured to receive a bitmap header and image data from interface 220. The bitmap header and image data in buffer 230 are shown at reference numbers 232 and 234, while the bitmap header and image data in buffer 235 are shown as 236 and 238. The separate numbering indicates that each buffer contains image data from immediately adjacent (i.e. immediately prior or immediately subsequent) image frames, rather than the same data. In this manner, the transfer buffers 230, 235 act as ping-pong buffers, wherein one transfer buffer may receive the bitmap header data and image data from interface 200 for a currently-read image frame while the other transfer buffer transfers previously acquired image data to a common data frame buffer 250 and header data to a plurality of client header buffers 240, 242, 244.

The image data 234, 238 received from interface 220 comprises only those regions of the data that are changed from the immediately prior image, and the bitmap headers 232, 236 received from interface each 220 comprises a bitmap that denotes the locations of the changed regions of image data in the overall image frame. The bitmap header may express the changed regions of image data on a pixel-by-pixel basis, or as larger groups of pixels.

The common data frame buffer 250 is configured to store a complete frame of data. The image data in the common data frame buffer 250 is updated from the transfer buffers 230, 235 by reading in the changed portions of the image data 234 as mapped by the bitmap header 232.

Each client header buffer 240, 242, 244 is configured to hold a copy of a bitmap header transferred from transfer buffers 230, 235. Therefore, a client that wishes to update the frame of data stored in its own cache can first obtain its client header data to determine which areas of the frame of data from the touch-sensitive input device have changed from a previous frame, and then acquire only those changed regions of data from the common data frame buffer 250. As opposed to the common data frame buffer 250, the client header buffers 240, 242, 244 are unshared in that each client has its own client header buffer 240, 242, 244 for its exclusive use.

As described above, the clients may request image data at different times and/or different rates. If a client requests/reads image data at a sufficiently fast rate, that client's header buffer 240, 242, 244 may be emptied before the next bitmap header data is read into the client header buffer. However, if a client does not read or request image data at a sufficiently fast rate, then simply writing over any unconsumed bitmap header data in that client's header buffer with new bitmap header data may cause prior image changes to be lost.

To avoid such a loss of prior image changes, in some embodiments, an image change history may be accumulated in the client header. The change history may be tracked in any suitable manner. For example, in one embodiment, new bitmap header data can be read into the client header buffers 240, 242, 244 by logically OR'ing the bitmap header data with the current contents of each client header buffer 240, 242, 244. In this manner, any bitmap header information not yet consumed by a client is preserved when the new bitmap header information is received. An example of such an OR operation is described with reference to FIGS. 4-6 below. In this manner, a client header may accumulate changes and preserve image changes until they are consumed by a client.

Figure 3:
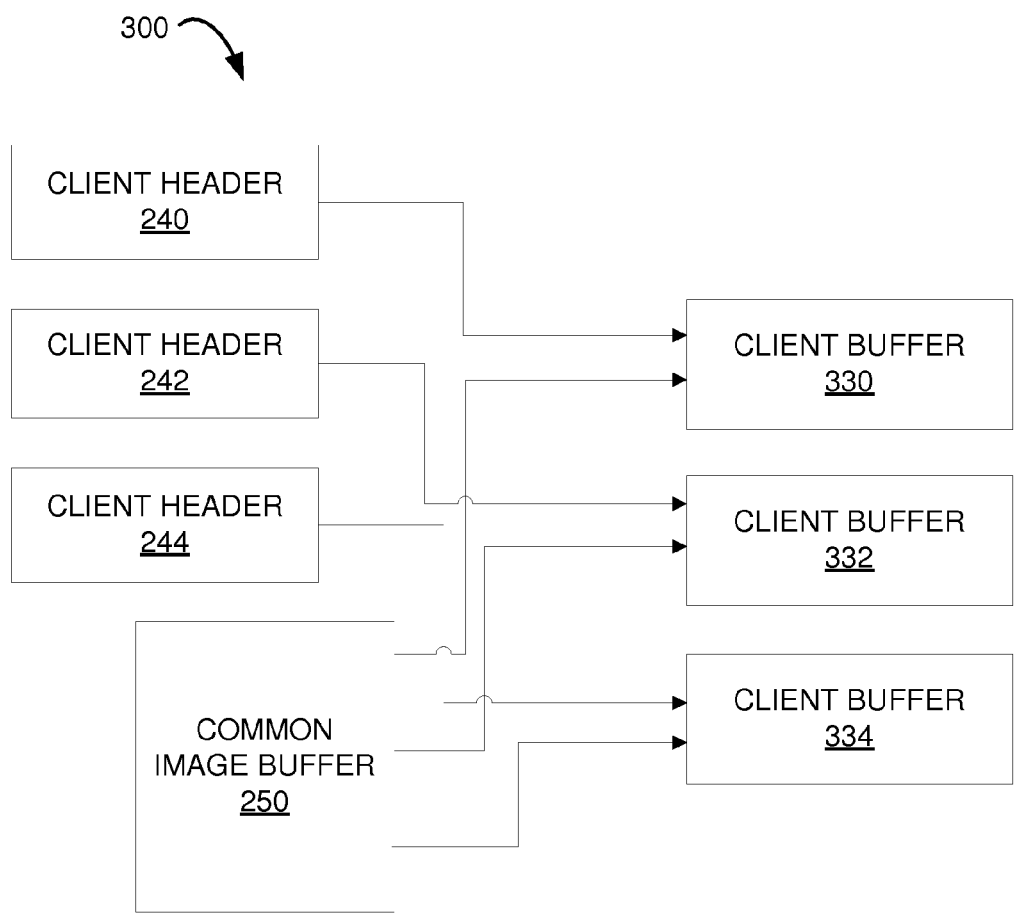
FIG. 3 shows a block diagram of an embodiment of an image data buffering system illustrating data flow from a common data frame buffer to multiple client buffers.

Next, FIG. 3 illustrates, at 300, the transfer of image data from common data frame buffer 250 to multiple client buffers 330, 332, 334 using bitmap header data stored in client header buffers 240, 242, 244. While three client buffers and three related client headers are shown for the purpose of example, it will be understood that embodiments are not so limited and the number of client buffers can scale relative to the number of supported clients.

As described above, a frame of image data is stored in common data frame buffer 250, while client header buffers 240, 242, 244 store client headers specific to each client that contain information identifying changed portions of image data to be acquired from the common data frame buffer 250. A first client can update client-stored image data in its client buffer 330 by first obtaining the bitmap header contained in its client header buffer 240, and then retrieving from the common data frame buffer the portions of the image data specified as changed by the information in the client header. Likewise, a second client and third can each update image data in their respective client buffer 332, 334 by obtaining the bitmap header from their respective client header buffers 242, 244. Therefore, the present approach may be used to maintain one common data frame buffer 250 and multiple client-specific headers 240-244 that identify the changed regions for each client. In this way, image data can be supplied to multiple clients from a common data frame buffer 250, and the image data may be portions or all of the image data stored in the common data frame buffer 250 relative to the state of each respective client. It will be appreciated that a client also may request to update a full image data frame. In this case, the entire contents of common data frame buffer 250 are obtained by the client. The client may use the data frame in conjunction with the bitmap header to do its own image processing.

Figure 4:
FIG. 4 shows embodiments of bitmap header data contained in first and second client header buffers prior to consumption of the bitmap header data.
Figure 5:
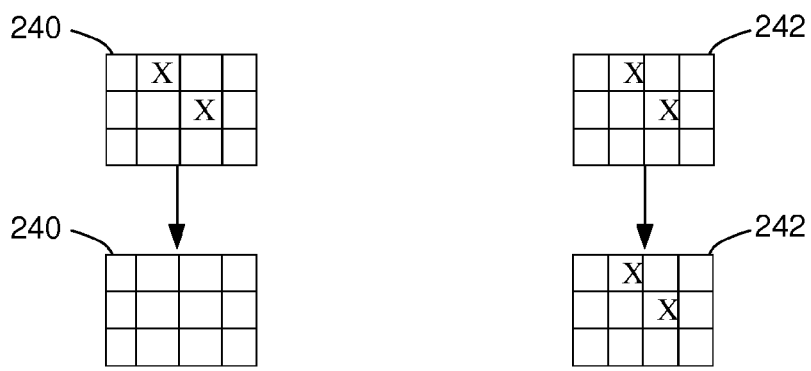
FIG. 5 illustrates the consumption of bitmap header data in one of the first and second client header buffers of FIG. 4.
Figure 6:
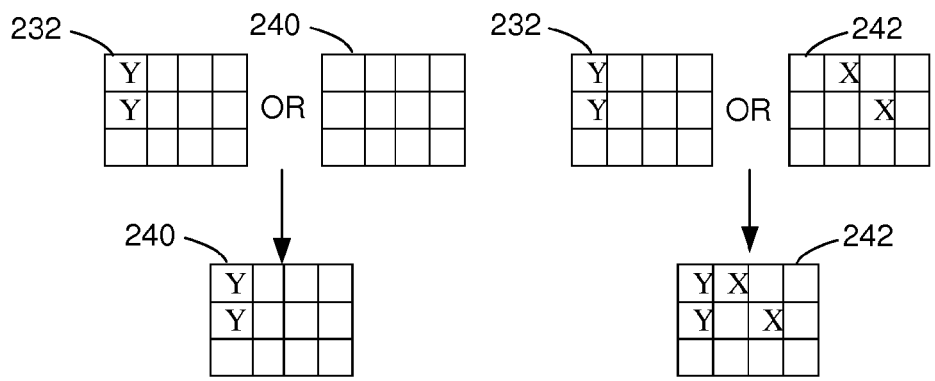
FIG. 6 illustrates the updating of the client header buffers of FIG. 4 with new bitmap header data.

FIGS. 4-6 illustrate the updating of the client buffer headers 240 and 242 in more detail. Referring first to FIG. 4, a simple schematic is shown of bitmap header data stored in first and second client header buffers 240 and 242, respectively. In FIG. 4, an X denotes changed regions of the image in the bitmap header. Next, the first client requests updated image data, while the second client does not make such a request. As a result, as illustrated in FIG. 5, the bitmap header in the first client's client header buffer 240 is consumed, while the bitmap header remains in the second client's client header buffer 242. Next, a new bitmap header is received from the touch data acquisition system. This is illustrated by buffer 232 in FIG. 6 and Y in the bitmap header represents the changed regions in the current frame of the image. To preserve any unconsumed changes in the client header buffers 240 and 242, the new bitmap header is logically OR'd with the data currently in the client header buffers. As shown in FIG. 6, this results in the preservation of the unconsumed bitmap header data in client header buffer 242.

In this manner, a plurality of clients can update a client-stored data frame at different times and rates, yet obtain the most up-to-date data frame available while preserving changes from prior updates. While disclosed herein in the context of an optical touch-sensitive display device, it will be appreciated that the disclosed embodiments may also be used in any other suitable touch-sensitive device, such as capacitive or resistive devices, and/or with any other suitable machine vision device. It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An optical touch-sensitive device, comprising:
a touch data acquisition system configured to acquire a frame of data from a touch-sensitive display screen and to determine changed portions of the frame of data relative to a previous frame of data from the display screen;
a processor; and
memory comprising instructions executable by the processor to:
receive the changed portions of the frame of data from the touch data acquisition system and store the changed portions of the frame of data in a common data frame buffer;
receive a bitmap header from the touch data acquisition system that specifies locations of the changed portions of the frame of data; and
store the bitmap header in each of a plurality of client header buffers while preserving unconsumed bitmap header data in the client header buffers.

2. The device of claim 1, wherein the instructions are executable to preserve unconsumed bitmap header data by logically OR'ing the bitmap header with each client header buffer.

3. The device of claim 1, wherein the instructions are executable to receive a request from a first client for transfer of the bitmap header stored in a first client header buffer, and to transfer the bitmap header to the first client.

4. The device of claim 1, wherein the instructions are further executable to receive from the first client a request for a portion of the frame of data specified in the bitmap header, and to transfer the portion of the frame of data to the first client.

5. The device of claim 1, wherein the instructions are executable to receive a request from a second client for transfer of the bitmap header stored in a second client header buffer, and to transfer the bitmap in the second header client header buffer to the second client, wherein the second client is operating in a different session than the first client.

6. The device of claim 1, wherein the instructions are executable to send a full frame image to a client buffer.

7. A computer-readable storage medium excluding signals per se, the computer-readable storage medium comprising instructions executable by a computing device to cache data from a touch-sensitive device in a common data frame buffer for access by multiple clients, the instructions being executable to perform a method comprising:
receiving data comprising changed portions of a previously buffered frame of data;
receiving a bitmap header specifying locations of the changed portions of the previously buffered frame of data;
storing the data in a common data frame buffer in the locations specified by the bitmap header;
storing the bitmap header in each of a plurality of client header buffers;
receiving a request from a client for transfer of the bitmap header stored in a client header buffer corresponding to that client;
providing the bitmap header to the client from the client header buffer;
receiving a request from the client for portions of the data in the common data frame buffer specified by the bitmap header; and
providing the portions of the data in the common data frame buffer to the client.

8. The computer-readable storage medium of claim 7, wherein storing the bitmap header in each of a plurality of client header buffers comprises preserving unconsumed header data stored in the plurality of client header buffers.

9. The computer-readable storage medium of claim 8, wherein preserving unconsumed header data comprises logically OR'ing the bitmap header with each client header buffer.

10. The computer-readable storage medium of claim 7, wherein the client is a first client, and further comprising receiving a request from a second client for transfer of the bitmap header stored in a client header buffer corresponding to the second client.

11. The computer-readable storage medium of claim 10, wherein the first client and second client are applications running in a same session.

12. The computer-readable storage medium of claim 10, wherein the first client and the second client are running in different sessions.

13. The computer-readable storage medium of claim 7, further comprising sending a full data frame to a client buffer.

* * * * *